United States Patent [19]

Bermingham

[11] Patent Number: 4,845,996
[45] Date of Patent: Jul. 11, 1989

[54] TEST SYSTEM FOR CAISSONS AND PILES

[75] Inventor: Patrick Bermingham, Dundas, Canada

[73] Assignee: Berminghammer Corporation Limited, Canada

[21] Appl. No.: 190,163

[22] Filed: May 4, 1988

[30] Foreign Application Priority Data

Apr. 7, 1988 [CA] Canada ................................. 563495

[51] Int. Cl.⁴ .............................................. G01N 3/00
[52] U.S. Cl. ..................................... 73/807; 73/786; 73/818; 73/35
[58] Field of Search ................. 73/807, 818, 786, 35, 73/12

[56] References Cited

U.S. PATENT DOCUMENTS

| | | | |
|---|---|---|---|
| 3,248,924 | 5/1966 | Boynton | 73/807 X |
| 3,503,254 | 3/1970 | Menard | 73/786 X |
| 3,505,860 | 4/1970 | Bishop et al. | 73/807 |
| 3,798,962 | 3/1974 | Dibley et al. | 73/786 X |
| 3,863,499 | 2/1975 | Van Bouteville et al. | 73/35 X |
| 3,960,008 | 6/1976 | Goble et al. | 73/84 |
| 3,978,722 | 9/1976 | Glötz et al. | 73/786 X |
| 4,347,743 | 9/1982 | Rausche et al. | 73/654 |
| 4,359,890 | 11/1982 | Coelus | 73/12 |
| 4,379,401 | 4/1983 | San Miguel | 73/12 |
| 4,474,052 | 10/1984 | Bodurtha, Jr. et al. | 73/35 |
| 4,479,378 | 10/1984 | Malakhoff | 73/35 X |
| 4,586,366 | 5/1986 | Milberger | 73/12 |
| 4,619,218 | 10/1986 | Kenny | 114/295 |

Primary Examiner—Tom Noland
Attorney, Agent, or Firm—Larson and Taylor

[57] ABSTRACT

A test system for caissons, piles and the like provides an improved way of testing the load bearing capabilities of such inground foundation elements. The test method involves supporting an inertial mass, e.g. of concrete rings, on the upper end of a columnar foundation element that is installed in the ground and generating in a chamber defined between the underside of the inertial mass and the upper end of the foundation element over a limited duration a propellant gas pressure sufficient to accelerate the inertial mass upwards away from the upper end of the foundation element and at the same time to produce a downwards reaction force of a predetermined desired magnitude on the element. The rate of increase of fluid pressure is controlled such that the reaction force does not damage the foundation element. The magnitude of the downwards force and the response of the foundation element are measured by suitable instrumentation.

14 Claims, 3 Drawing Sheets

TEST SYSTEM FOR CAISSONS AND PILES

FIELD OF THE INVENTION

This invention relates to a new or improved test system for caissons, piles and the like providing an improved process and apparatus for testing the load bearing capabilities of such inground foundation elements.

DESCRIPTION OF THE PRIOR ART

The capacity of foundation elements such as caissons can be tested by either of two conventional techniques. In the first, a support structure is built spaced above the top end of the caisson and loaded with a large mass. For example steel beams and piles may be fabricated into a rough box-shaped structure which is then loaded with sand or concrete blocks. A hydraulic jack is then positioned between the top of the caisson and the underside of the support structure and is expanded to jack against the underside of the weighted structure and in this way apply a controllable downwardly directed reaction load to the casson. Using this technique large reaction forces may be produced, but the equipment is cumbersome, and accordingly the test procedure is time consuming and expensive.

The second conventional test method involves the use of two auxiliary foundation elements spaced one on each side of the caisson to be tested. A large beam is then positioned to span across the three inline foundation elements and attached to the auxiliary foundation elements. A hydraulic jack is then placed between the top of the caisson to be tested and the underside of the beam in the center of the span. The ends of the beam being anchored to the auxiliary foundation elements apply the upwardly directed force of the jack to these in tension, the downwards reaction force of the jack being applied to the foundation element to be tested. In this way a high reaction force may be obtained. However this test procedure is also time consuming and relatively expensive.

The third method of testing involves testing the resistance of the pile to movement during application of a dynamic load. The pile to be tested is struck with a falling mass and instruments attached to the pile record the downward velocity and force produced in the pile. Analysis of the results will determine the portion of the resistance mobilized by the impact. In the case of piles or caissons which have a high resistance it is difficult to introduce enough energy into the pile to fully mobilize all of its resistance without damaging the pile top or causing a tension break in the pile. The falling mass, typically a large drop hammer, is bulky and cumbersome to use and requires large equipment to operate.

Accordingly, because of the expense and inconvenience of known testing procedures for caissons and similar drilled pier foundation elements, very often full scale load testing of such foundations is not performed. Instead, the pier/soil friction values are estimated using laboratory testing and correlations with soil index properties. Depending upon the site soil conditions that are encountered, such theoretical and laboratory calculations may tend to significantly underestimate the overall shear strength and friction values of the soil. As a result, the design of foundations is often overly conservative, including excessively high safety factors. This then results in the cost of such foundations being unnecessarily expensive.

Accordingly there is a clear need for a cheaper and more convenient system for testing foundation elements such as caissons and piers so that the foundation design criteria developed are not only more economical, but also more realistic and more reliable than those based upon laboratory testing procedures.

SUMMARY OF THE INVENTION

Accordingly, the present invention provides a method for testing the load-bearing capacity of a columnar inground foundation element, comprising: supporting an inertial mass of predetermined magnitude on the upper end of a columnar foundation element that is installed in the ground; generating in a chamber defined between the underside of the inertial mass and the upper end of said foundation element over a limited duration a fluid pressure sufficient to accelerate said inertial mass upwards away from the upper end of the foundation element and at the same time to produce a downwards reaction force of a predetermined desired magnitude on said element; controlling the rate of increase of said fluid pressure such that the reaction force does not damage the foundation element; and measuring both the magnitude of said downwards force and the response of said foundation element.

The fluid pressure is preferably generated by the combustion of a propellant charge, with the inertial mass being guided to move upwards axially of the foundation element. The escape of the gases produced by the combustion is controlled in such a manner as to attenuate soundwaves produced by the combustion.

Desirably, the upper end of the foundation element will be protected from impact by the inertial mass when it descends under gravity after the fluid pressure has been dissipated.

The invention also provides apparatus for testing the load-bearing capacity of a columnar inground foundation element, comprising: a base adapted to be affixed coaxially on the upper end of said foundation element; a carrier configured to be seated coaxially on said base and adapted to support an inertial mass of a desired magnitude; chamber means defined between said base and said carrier and comprising a cylinder having opposite ends associated with said base and said carrier respectively, said chamber having a volume which increases as said carrier moves upwardly away from its seated position on said base; pressure generating means for producing a controlled rapid increase in fluid pressure in said chamber of a magnitude sufficient to accelerate upwards said carrier and inertial mass and to produce a corresponding downwards reaction force on said base; pressure transducer means to measure continuously the magnitude of said downwards force as a function of said fluid pressure; and displacement transducer means adapted to measure the response of the foundation element to such downwards force.

Preferably the base has a central axial piston element received in a cylindrical bore opening from the underside of the carrier, the end of the piston being formed with a recess to receive a charge of a combustible propellant compound. The ignition means for this charge is arranged to be actuated from outside the cylinder. The inertial mass may be in the form of one or more toroidal rings, suitably of concrete, positioned around the exterior of the cylinder and thus aligned to the vertical axis of the foundation element.

To prevent impact of the carrier upon the base when the carrier descends after having been accelerated upwards by the pressure of the propellant gases, provision may be made to interpose sand or gravel between the underside of the carrier and the top of the base. Thus, for example, an annual cavity may be provided surrounding the toroidal rings, and this cavity filled with gravel which will slump to spread under the carrier when the later is raised.

BRIEF DESCRIPTION OF THE DRAWINGS

The invention will further be described, by way of example only, with reference to the accompanying drawings wherein.

DESCRIPTION OF THE PREFERRED EMBODIMENTS

Figure 1:
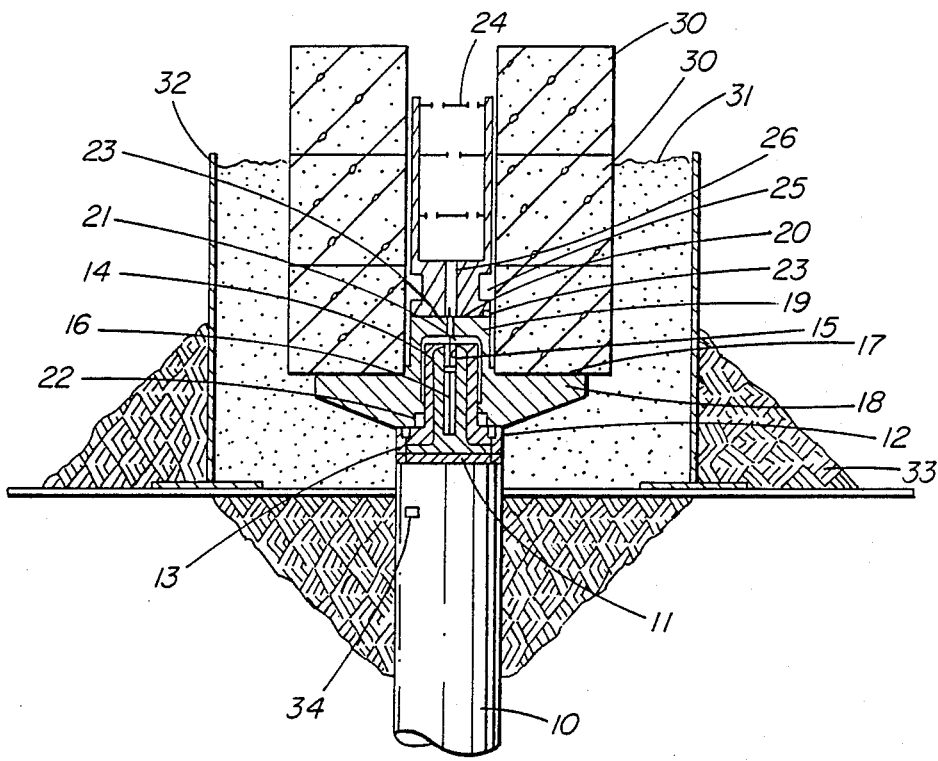
FIG. 1 is a somewhat schematic longitudinal sectional view of a presently preferred embodiment of test apparatus shown installed on the upper end of a drilled cast in place foundation element.

Referring to FIG. 1, a cast in place inground foundation column or cassion 10 that is to be tested has a disc-shaped steel plate 11 grouted to its upper end. A launching base 12 is bolted on top of the steel plate so that it is axially aligned with the caisson 10, the base having an annular flange 13 at its lower end, and an upwardly projecting piston 14 that is axially aligned with the caisson 10. The piston has a central counterbore 15 opening from its upper face to receive a propellant charge 16.

Figures 2, 3:
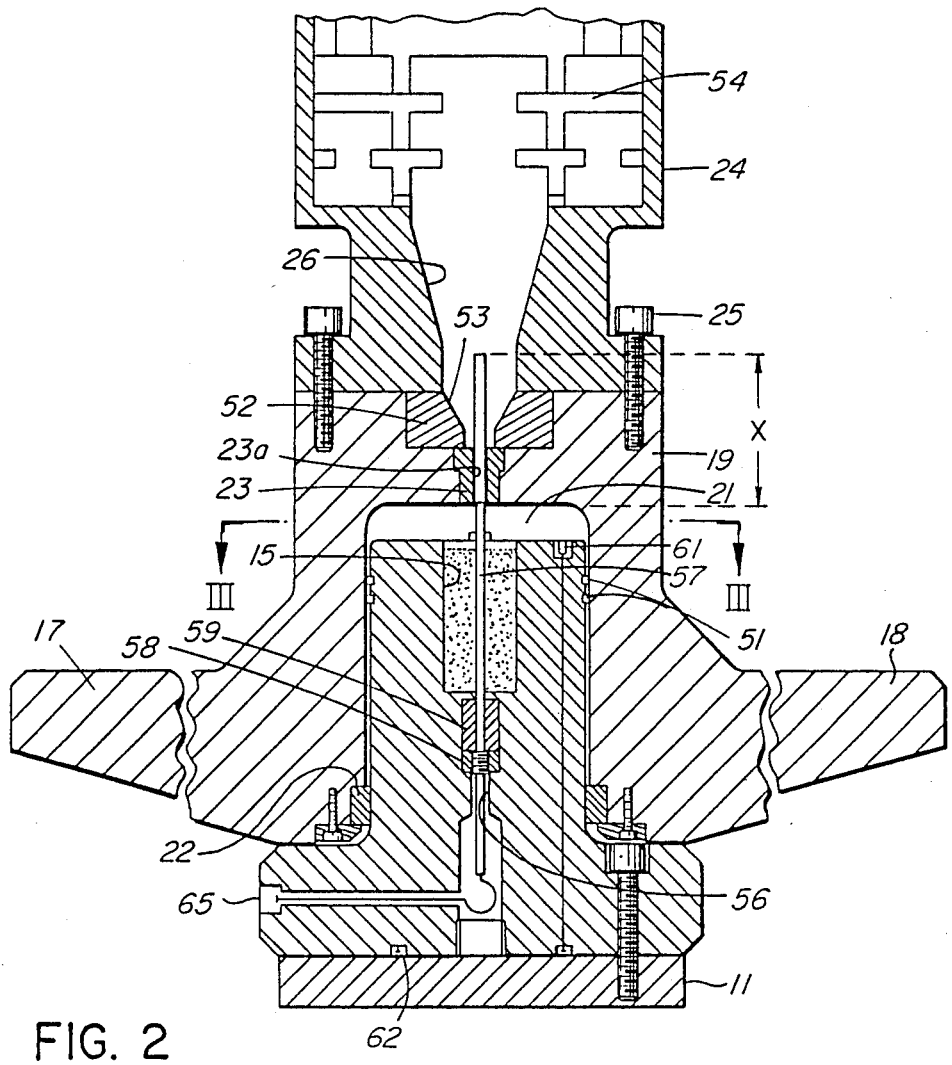
FIG. 2 shows a portion of FIG. 1 to an enlarged scale.
FIG. 3 is a cross-section taken on the line III—III of FIG. 2.

As is more clearly shown in FIG. 2, a launch cylinder assembly 17 has a radially extending plate 18 at its lower end adapted to rest upon the flange 13 of the launching base as seen in FIG. 1, and a cylindrical portion 19 projecting axially upwards beyond the plate 18 and terminating in an end wall 20. A cylindrical expandable chamber 21 is thus defined between this end wall 20 of the cylinder assembly, and the upper end of the piston 14.

The launching base 12 and the cylinder assembly 17 are preferably fabricated in steel, there being a copper gas seal 22 and piston rings 51 of steel positioned to provide sealing between the cooperating cylindrical walls. An insert 23 is provided coaxially in a recess in the end wall 20 of the cylinder and defines an axial gas vent 23a extending therethrough. The insert 23 is fabricated in a suitable eroding combustible material such as copper and leads to a cylindrical silencer 24 positioned on top of the cylinder and fastened thereto by bolts 25. A replaceable annular throat 52 is seated above the insert 23 and has a conically widening bore 53 that communicates with a gas passage 26 in the lower end of the silencer. The gas passage 26 increases in cross section upwardly, is in register with the gas vent 23a, and is in communication with the interior of the silencer 24 which incorporates suitable sound attenuating means such as a system of baffles 54. The silencer 24 is generally of cylindrical form and has an outer diameter that corresponds to the outer diameter of the cylindrical portion 19 of the cylinder assembly 17.

The upper side of the plate portion 18 of the launch cylinder is flat and is designed to provide a seat to support a reaction mass which is in the form of a plurality of toroidal concrete rings 30, these rings being aligned to the axis of the caisson 10 by the cylinder 19 and silencer 24. The above-described structure is surrounded by a mass of loose sand or gravel 31 that is contained within a cylindrical wall 32 spaced concentrically with respect to the rings 30. This wall 32 is supported on its outer lower side by a ring of backfill material 33, such material also surrounding the upper end of the caisson 10.

The structure of the piston 14 is best illustrated in FIGS. 2 and 3 as comprising an axial bore 56 through which extends a vent rod 57 that is in threaded engagement with an insert 58 seated in the bore 56. The rod 57 passes through a seal structure 59, and then extends axially upwards through the propellant charge 16 received in the counterbore 15, through the gas vent 23a formed in the insert 23, and upwardly to a predetermined height X (FIG. 2) above the lower surface of the end wall 20 of the cylinder 19.

To monitor the pressure within the cylinder, three equiangularly spaced pressure transducers 61 are recessed in the top wall of the piston 14, these being connected to the exterior of the apparatus through suitable electrical wiring 62 passing through the flange 13 of the launching base 12 of the piston.

The vent rod 57 is fabricated in a suitable electrically conductive material, and is utilized to transmit current to effect initiation of the propellant charge 16. To this end there is an electrical connection 65 formed between the lower end of the vent rod 57 and the periphery of the flange 13, where it can be connected to external current supply means. A hot wire assembly 66 having three radial limbs of resistance wire is positioned between the vent rod 57 and surrounding portions of the end surface of the piston 14, the rod otherwise being insulated from the piston and from the cylinder assembly 17. It will be appreciated therefore that when current is applied to the connection 65 the hot wire assembly 66 will be heated and will effect initiation of the combustion of the propellant charge 16.

The pressure transducers 61 monitor the pressure within the chamber 21 on a continuous basis. A velocity displacement transducer 34 is attached to the surface of the caisson to monitor displacements thereof.

In use, the cylinder bore 15 is loaded with a quantity of propellant charge 16 having combustion characteristics sufficient to generate the desired pressure in the chamber 21. The launch cylinder assembly 17 is then placed over the piston in the position shown in FIGS. 1 and 2 and loaded by the concrete rings 30 to provide a reaction mass of the desired magnitude. Upon ignition of the propellant charge, gas pressure in the chamber 21 increases very rapidly providing a force to launch the cylinder assembly 17 and its weight 30 vertically upwards, providing at the same time an equal and opposite downwardly acting reaction force upon the piston 14. This reaction force is of course coaxial with respect to the caisson 10 since the cylinder assembly is guided by the piston 14.

At commencement of combustion, the combustion gases are sealed within the chamber 21 since the vent 23a is closed by the vent rod 57 passing therethrough. However once the gas pressure has raised the launch cylinder assembly 17 by the distance X, then the vent 23 is unblocked and permits escape of the combustion gases through the silencer 24. The flow of the hot combustion gases through the vent 23a rapidly erodes the material of the insert 23, widening the cross section of the vent 23a so that the gas pressure within the chamber 21 will dissipate relatively rapidly after combustion of the propellant 16 has been completed.

Figure 4:
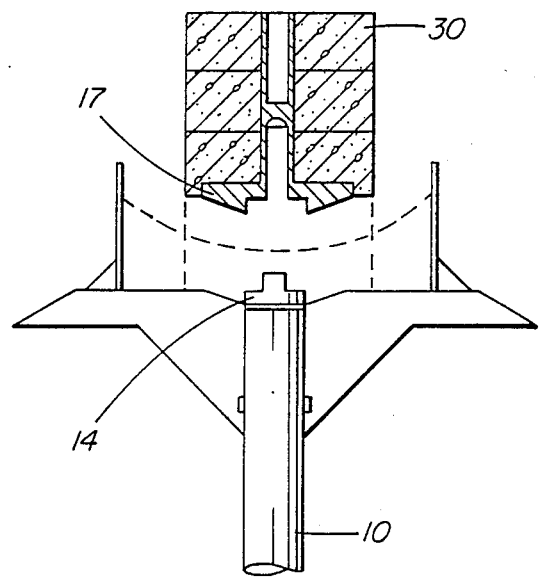
FIG. 4 is a somewhat schematic view illustrating the testing apparatus in operation.

FIG. 4 shows schematically the arrangement after the cylinder assembly and the reaction mass have been launched. This will rise by no more than a few feet before beginning to descend again under the force of gravity. However before descent occurs, the surrounding mass of sand 31 will collapse under the plate 18 of the cylinder assembly and thus provide a cushion between this and the top of the caisson 10 when the cylinder assembly and reaction mass descend under the force of gravity. Thus impact damage to the caisson is avoided.

Figure 5:
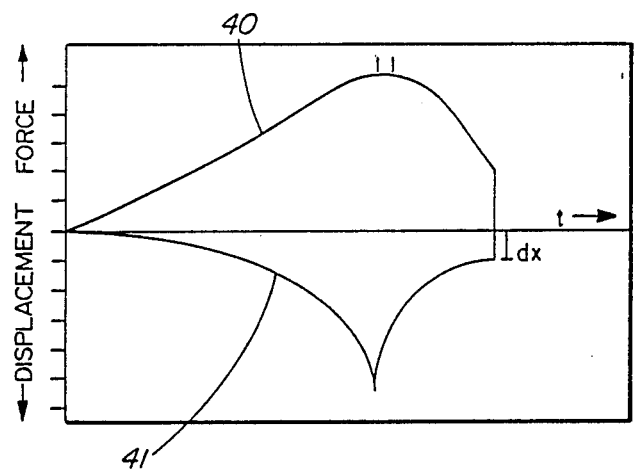
FIG. 5 is a graph illustrating the force generated and the displacement of the foundation element over time during operation of the testing apparatus.

The graph 40 in FIG. 5 shows the change in pressure with time commencing with the initiation of combustion of the propellant charge as measured by the pressure transducer in the chamber 21, and the lower graph 41 shows the corresponding displacement of the top end of the caisson 10 as measured by the velocity transducer 34. It will be seen that as the pressure in the chamber 21 increases, the downwards displacement of the caisson 10 likewise increases, reaching a maximum at the same time as the chamber pressure, and thereafter diminishing, there being a residual displacement dx indicating that the frictional engagement between the caisson 10 and the surrounding ground formation has been stressed to failure point producing a permanent minor displacement of the caisson.

The rate at which the pressure in the chamber 21 increases is a function of the characteristics of the propellant charge 16, and may be varied by appropriate selection of propellant materials. Preferably the desired reaction force should be developed over a duration of approximately 40 to 60 milliseconds which is almost 10 times longer than the duration of a force which could be achieved through impact of dropping a similar mass on top of the caisson 10. The duration over which the reaction force acts can be varied to some extent by variation in the length X by which the vent rod 57 projects. By increasing the dimension X, the duration of confinement of the combustion gases in the chamber 21 will be extended, and vice versa if the dimension X is reduced.

Thus the invention provides a method of introducing high energies into the caisson 10 without damaging the latter. Reaction forces in the range 400 to 600 tons can be achieved by using a reaction mass that is of no more than 32,000 pounds weight. The equipment consists essentially of the launching base 12, and the launch cylinder assembly 17, which is essentially of light weight and is easily transported. The concrete rings 30 forming the reaction mass weigh no more than 10,000 pounds each, and in fact may readily be cast in situ at the same time as the test caisson itself is cast, and thus need not be transported from one site to another. It will be appreciated that because of the relatively low weights of the components, no special heavy weight materials handling equipment is necessary for installation of the test apparatus.

In addition to utilizing the instrumentation described above to produce an onsite graph or displacement and force, the above described test procedure can also be used in conjunction with the CAPWAPC (trademark) program to determine the capacity and distribution of resistance forces between the caisson 10 and the ground formation.

Figure 6:
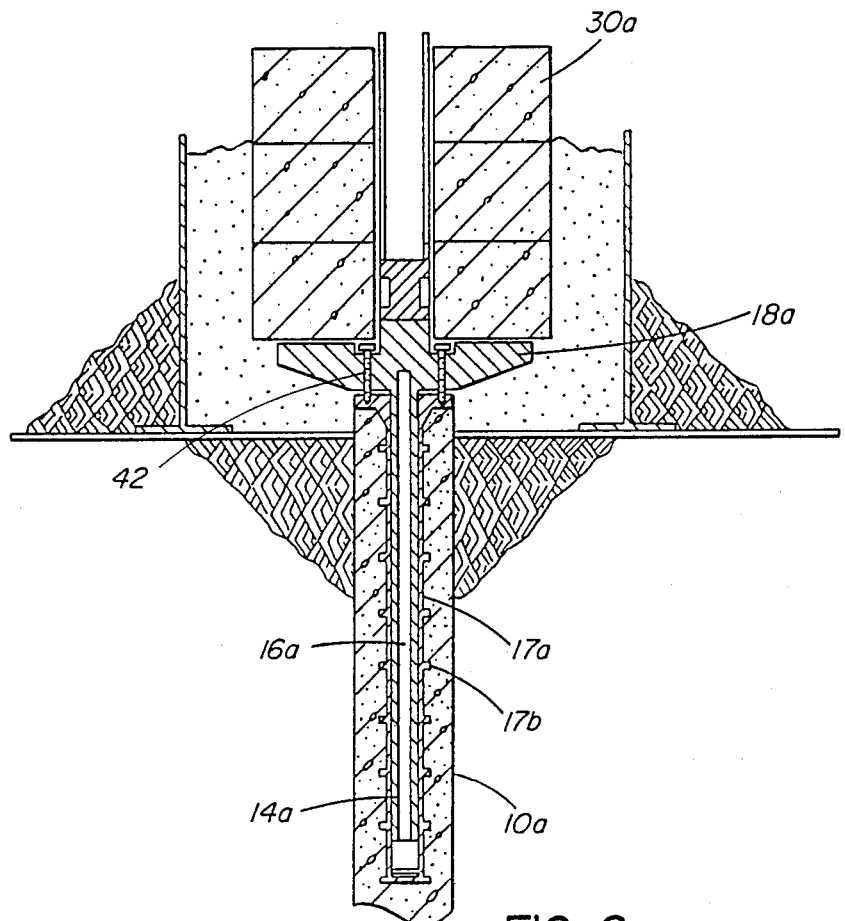
FIG. 6 is a longitudinal sectional view of a modified construction of testing apparatus.

In an alternative arrangement illustrated in FIG. 6, use is made of a relatively small diameter piston and cylinder having a long stroke. In this arrangement the elongated cylinder 17a having reinforcing ribs 17b thereon is cast in place within the upper end of the caisson 10a. An elongated piston 14a is received within the cylinder 17a and is connected at its upper end to a launch plate 18a on which the concrete rings 30a forming the reaction mass are supported. The launch plate 18a is secured to the end of the piston by frangible bolts 42. A slow burning propellant is provided in the elongate chamber 16a. When the propellant is ignited, the gas pressure increases until a desired level has been reached at which the bolts 42 fail, whereupon the reaction force of this gas pressure is applied to the caisson 10a. With this arrangement therefore the reaction force would be applied to the caisson over a shorter durational though still at a much slower rate than were the energy transferred to the caisson through the impact of a falling body.

The test system of the present invention provides a means by which caissons and piles can be load tested in a much cheaper and more convenient manner than was hitherto possible. By launching a relatively small mass (e.g. 8 cubic meters of concrete) into the air from a rest position on top of the caisson, a relatively large reaction force (up to 1,000 tons or more) can be developed over a relatively long duration such that the energy input to the caisson is not at a rate that will result in destruction of the latter. Thus onsite full scale load testing can be performed in a relatively simple and inexpensive manner. This produces the overall benefit of being able to check accurately the load bearing capacity of a foundation member with reference to its designed load. Since such testing reveals excess capacity, substantial cost saving can be effected by modifying the foundation design. By utilizing the CAPWAPC program in conjunction with the above described test procedure it is possible to determine the distribution shaft resistance in an accurate manner so that the foundation design can be fine tuned to eliminate factors of ignorance, yielding a safe adequate design without the excess cost of overdesign.

It will be appreciated that because of the configuration of the above described apparatus, the reaction force is concentric to the longitudinal axis of the caisson. Furthermore, the test procedure can be applied to caissons or batter piles that are positioned in the ground at an angle to the vertical, since the reaction force developed is in the direction of the axis of the foundation element, and is not significantly influenced by gravity.

The test procedure can be applied to foundation elements that are installed in the ground or in underwater sites. In the latter, the fluid resistance of the water will act to augment the inertial forces of the reaction mass, and thus a smaller mass may be utilized.

Furthermore it will be appreciated that the design could be modified to make use of atmospheric air pressure to develop the reaction force, although this would entail utilizing a reaction member of a very large surface area.

I claim:

1. A method for testing the load-bearing capacity of a columnar inground foundation element, comprising:

supporting an inertial mass of predetermined magnitude on the upper end of a columnar foundation element that is installed in the ground;

generating in a chamber defined between the underside of the inertial mass and the upper end of said foundation element over a limited duration a fluid pressure sufficient to accelerate said inertial mass upwards away from the upper end of the foundation element and at the same time to produce a downwards reaction force of a predetermined desired magnitude on said element;

controlling the rate of increase of said fluid pressure such that the reaction force does not damage the foundation element; and measuring both the magnitude of said downwards force and the response of said foundation element.

2. A method according to claim 1 wherein said fluid pressure is generated by the combustion of a propellant charge.

3. A method according to claim 2 including controlling the escape of the gases produced by such combustion in a manner so as to attenuate sound waves produced by the combustion.

4. A method according to claim 1 wherein said inertial mass is guided to move upwards axially of said foundation element.

5. A method according to claim 1 including protecting the upper end of said foundation element from impact by said inertial mass when the latter descends under gravity after dissipation of said fluid pressure.

6. A method according to claim 1 wherein the magnitude of said downwards force and the dynamic response of the foundation element are measured on a continuous basis.

7. Apparatus for testing the load-bearing capacity of a columnar inground foundation element, comprising:

a base adapted to be affixed coaxially on the upper end of said foundation element;

a carrier configured to be seated coaxially on said base and adapted to support an inertial mass of a desired magnitude; chamber means defined between said base and said carrier and comprising a cylinder having opposite ends associated with said base and said carrier respectively, said chamber having a volume which increases as said carrier moves upwardly away from its seated position on said base;

pressure generating means for producing a controlled rapid increase in fluid pressure in said chamber of a magnitude sufficient to accelerate upwards said carrier and inertial mass and to produce a corresponding downwards reaction force on said base;

pressure transducer means to measure continuously the magnitude of said downwards force as a function of said fluid pressure;

and displacement transducer means adapted to measure the response of the foundation element to such downwards force.

8. Apparatus according to claim 7 wherein said base includes a central axial piston element that is slidingly received in a cylindrical bore opening from the underside of said carrier, said cylindrical bore having an end wall defining one end of said cylinder, the end of said piston comprising the opposite end of said cylinder.

9. Apparatus according to claim 8 wherein said piston is formed with a recess adapted to receive pressure generating means in the form of a charge of a combustible propellant compound, ignition means for said charge being provided and being adapted to be actuated from the exterior of said cylinder.

10. Apparatus according to claim 9 wherein a gas passage is provided in the end wall of said cylindrical bore to provide controlled release of combustion gases produced by said charge.

11. Apparatus according to claim 10 wherein said carrier is adapted to support said inertial mass of desired magnitude in the form of one or more toroidal rings adapted to be aligned to the vertical axis of the foundation element by engagement with the exterior of said cylinder.

12. Apparatus according to claim 7 wherein said pressure generating means comprises a charge of a combustible propellant compound.

13. Apparatus according to claim 7 including means to prevent impact of said carrier upon said base when the carrier, after having been accelerated upwards by said fluid pressure, descends under the force of gravity.

14. Apparatus according to claim 7 wherein said displacement transducer means is adapted to measure the dynamic response of the foundation element to such downwards force on a continuous basis.

* * * * *